Oct. 31, 1950     A. J. TACCHELLA     2,527,894
METHOD OF MAKING FROZEN FOOD PRODUCTS
Filed Feb. 4, 1947     3 Sheets-Sheet 1

INVENTOR.
Andrew J. Tacchella
BY
ATTORNEY

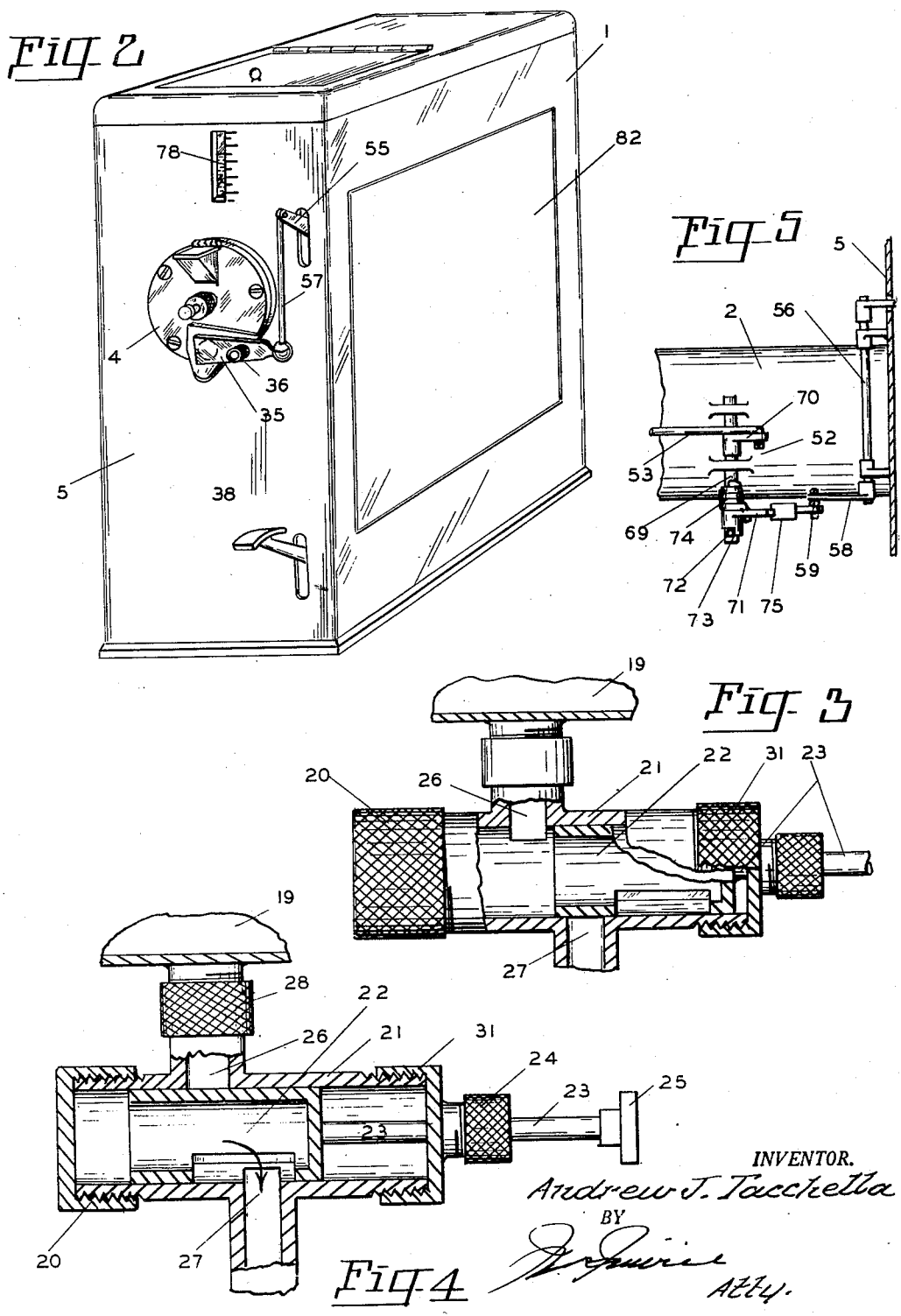

Oct. 31, 1950 — A. J. TACCHELLA — 2,527,894
METHOD OF MAKING FROZEN FOOD PRODUCTS
Filed Feb. 4, 1947 — 3 Sheets-Sheet 3

INVENTOR.
Andrew J. Tacchella
BY
ATTORNEY

Patented Oct. 31, 1950

2,527,894

UNITED STATES PATENT OFFICE 2,527,894

METHOD OF MAKING FROZEN FOOD PRODUCTS

Andrew J. Tacchella, Portland, Oreg., assignor, by mesne assignments, to Steady-Flow Freezer Co., Portland, Oreg., a corporation of Oregon Application February 4, 1947, Serial No. 726,296

1 Claim. (Cl. 62—174)

This invention is directed to a method of continuously producing a frozen product in the nature of an ice cream or like product for dispensing the frozen product as desired, and automatically compensating for the quantity of frozen product delivered by the introduction of the mix from which the frozen product is made at a time and in a quantity to compensate for the frozen product delivered.

The method also involves the automatic control of the delivery of the mix to the influence of a refrigerating agent to convert the mix into a frozen product for use with the quantity of mix delivered automatically determined both as regards the quantity of mix to be delivered and the time of that delivery to the influence of the refrigerating agent.

The method is also directed to insuring that the mix delivered to the influence of the refrigerating agent will be retarded with respect to the influence of the refrigerating agent in order that a proper preparation of the mix for final refrigeration can be obtained.

In carrying out the method the mix is maintained in indeterminate quantity for delivery to the influence of the refrigerating agent by which the mix is finally frozen for delivery as a usable frozen product, with the frozen product delivered for use at will and in turn providing for the automatic delivery of the mix from the indeterminate quantity to supply to the influence of the refrigerating agent a quantity of mix which will fully and completely compensate for the delivery of the frozen product for use in order that there may be a continuous provision of material which under the influence of the refrigerating agent will continuously supply a frozen product at will. The mix from the indeterminate quantity is automatically controlled in its delivery to the influence of the refrigerating agent to a degree to permit at any one delivery of such mix, a quantity thereof which will compensate for the quantity of frozen product developed from previous mix by the refrigerating agent and delivered for use as a frozen product.

The method is carried out by certain mechanical instrumentalities which are fully shown and described in my co-pending application filed April 6, 1945, Serial No. 586,967, now Patent No. 2,508,435, issued May 23, 1950, and to provide for a more graphic and complete illustration of the method steps the apparatus of the said co-pending application will be hereinafter fully and completely described and form a part of this method application.

Referring to the drawings:

Figure 2 is a front side perspective view of the assembled machine.

Figure 3 is a fragmentary detailed view of the measuring valve in measuring position, parts broken away for convenience of illustration.

Figure 4 is the same as that of Figure 3, illustrating the valve in the dispensing position.

Figure 5 is a fragmentary plan detailed view of part of the operating mechanism, taken on line 5—5 of Figure 1.

Figure 1:
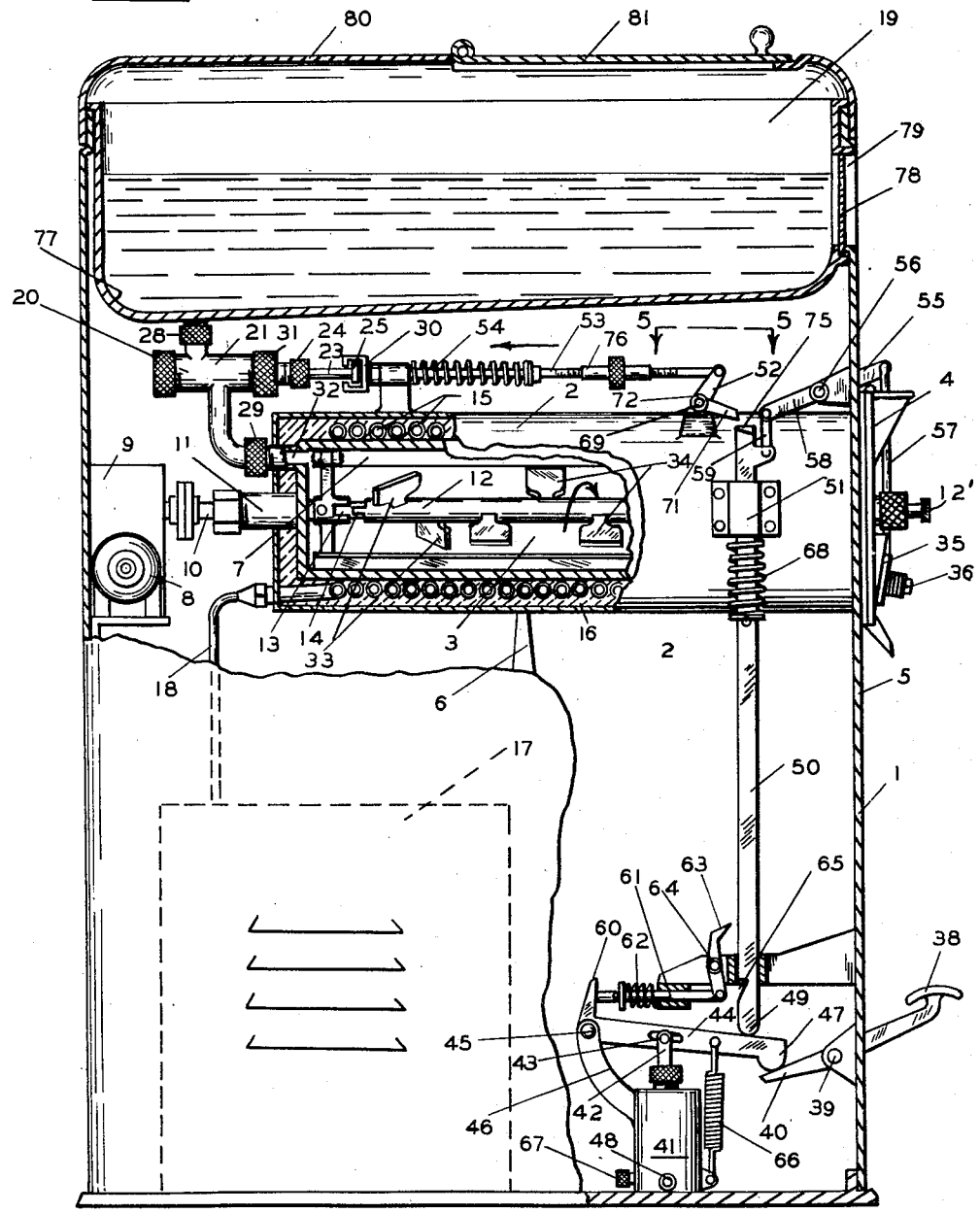
Figure 1 is a side elevation of my new and improved freezing machine, parts broken away for convenience of illustration.

My new and improved freezing machine consists of a cabinet 1, having a freezing drum assembly 2 mounted therein. The freezing assembly or drum 2 consists of an inner cylinder 3 terminating in a flange 4, which is mounted to the front 5 of the cabinet 1 by any suitable means. The drum assembly may be further supported by the supporting pedestal 6.

A motor 8 and speed reducing device 9 drives the shaft 10 which is journalled in a suitable bearing 11. Scraping blade assembly 7 is fixedly mounted to and is revolved by the shaft 10. A beater rotor 12 is rotatably mounted on the shaft 10, and when shifted endwise of the shaft may be locked in engagement with the assembly 7 at 13 by the dog 14. This beater rotor can be thrown in and out of rotation by the knob 12'.

The usual freezing coils 15 surround the freezing cylinder 3 and have insulation 16 therearound. The coils 15 receive their refrigerant from the freezing unit 17, indicated in dotted position, by way of the connections 18. Thus far I have described the well known freezer construction.

My invention consists primarily of mounting a mix supply tank 19 within the upper part of the cabinet 1. I have provided a special measuring valve assembly 20 between the supply tank 19 and the mixing cylinder 3.

I will now describe the measuring valve assembly 20, by referring to Figures 3 and 4. This valve assembly consists of a cylinder 21, having a special piston 22 working therein. A piston rod 23 extends through the stuffing box 24 and terminates in a suitable cross head 25. In Figure 3 it will be noted that the piston does not cover the port 26 leading from the tank 19 and is covering the port 27 leading to the freezing cylinder 3. The mix will flow into the piston 22 and the cylinder 21 while in this position, but when the piston is moved to the position shown in Figure 4 the port 26 will be closed and the port 27 opened, at the same time the piston 22 will forcibly eject the mix from the valve assembly 20 into the freezing cylinder 3. I do not wish to be limited to this type of measuring device, but I have illustrated this system to carry out the object of my invention and further the measuring assembly 20 can be readily removed from the machine and cleaned. It is connected to the tank 19 by the well known gland nut 28 and to the mixing cylinder 3 by the nut 29. The cross head 25 works within the special yoke 30 of the operating mechanism, which will hereinafter be described. The piston 22 can be readily removed from the cylinder 21 by removing the gland nut 31.

When the mix enters the freezing cylinder 3 by way of the port 32, it is desirable to retard its flow to the opposite end of the freezing cylinder. This is accomplished by the mixing paddles 33 being inclined in a direction as to force the mix to the rear of the freezing cylinder 3, or to where it enters at 32. The object of course is to insure a complete mixing of the mix before it reaches the discharge end of the mixing and freezing chamber. I do not wish to be limited to the mechanical method which I have illustrated, as other equivalents may be used so long as it retards the flow forward of the mix. In the design of my freezing chamber I make the length of the same relatively long in comparison to its diameter to insure a more complete mixing and freezing of the product.

I have found in the dispensing of creams and the like that it is most desirable to have a controlled and measured dispensing of the product, therefore I have provided a mechanism for accomplishing the desired result. I use the well known shutter or cut off gate 35, which is pivotally mounted at 36 and covers the discharge opening 37, indicated in dotted position in Figure 2. Ordinarily this shutter is opened by hand, but I have provided a means of operating this shutter by the foot of the operator and controlling the duration of opening by a mechanism that I will now describe.

A foot pedal 38 is pivotally mounted at 39 and has a lever 40 extending within the cabinet. A dash pot 41, having a piston working therein but not shown and having a piston rod 42 pivotally mounted at 43 to the lever arm 44, which in turn is pivotally mounted at 45 to the bracket arm 46 at its one end and having its other end 47 resting on top of the lever arm 40 of the foot pedal 38. When the foot pedal is depressed it will raise the lever 44 by contacting the end 47, which also raises the piston within the dash pot cylinder 41 taking air in through the check valve 48 into the dash pot cylinder. When the lever 44 was raised it also contacted the end 49 of the push rod 50, raising the rod 50 through its guide 51, contacting the bell crank assembly 52, forcing the connecting rod 53 against the spring 54 towards the measuring valve assembly 20. The yoke 30, which forms part of the rod 53, is also pushed in the direction of the arrow, forcing the measuring valve piston 22 to the positon shown in Figure 4, dispensing a measured amount of mix into the cylinder 3 by way of the port 32 as heretofore described. When the push rod 50 was raised it also opened the dispensing gate 35 in the following manner.

Figure 6:
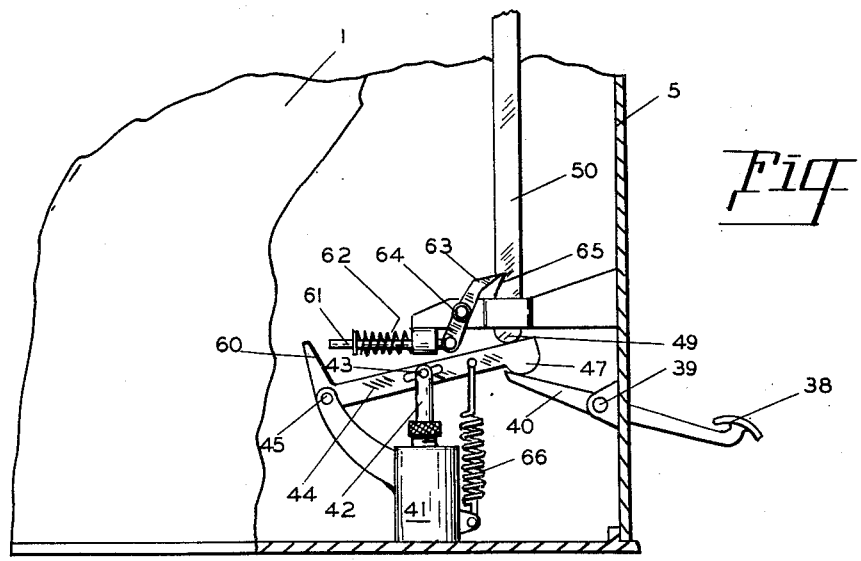
Figure 6 is a fragmentary detailed view of the foot operating and dash pot arrangement after the foot pedal has been depressed.

An arm 55 is fixedly mounted to the cross shaft 56 and is connected to the gate 35 by a suitable connecting rod 57. The cross shaft 56 has a crank arm 58 fixedly mounted thereto and connected to the push rod 50 by a connecting rod 59. As the push rod 50 was raised it rocked the arms 58 and 55 opening the gate 35 through the connecting rods 59 and 57. When the arm 44 was raised about its pivot point 45 a bell crank 60, forming part of the arm 44, permitted the push rod 61 to be forced to the left by the spring 62, pivoting the ratchet 63 about its center 64 allowing the said ratchet to drop into the notch 65 when the push rod was raised, best illustrated in Figure 6.

Figure 7:
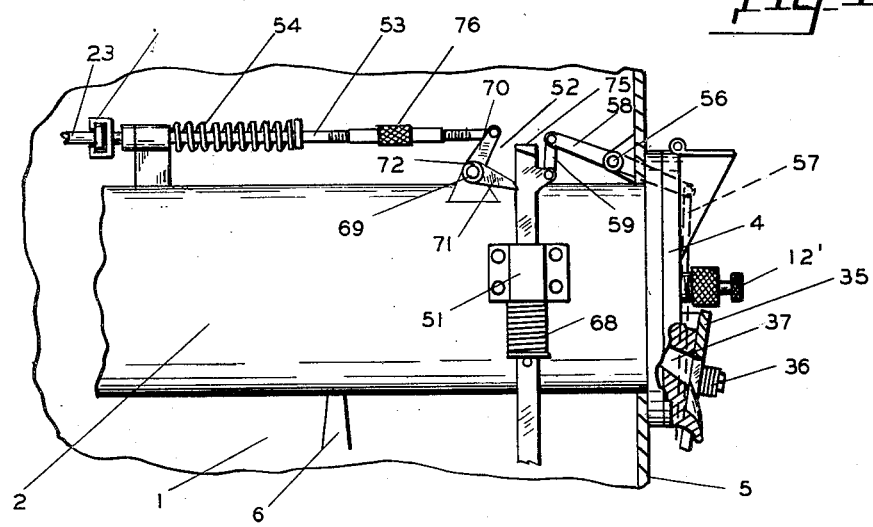
Figure 7 is a fragmentary detailed view of the upper end of the push rod actuating the shut off gate and having actuated the mix measuring valve.

When the push rod reached the position illustrated in Figure 7 it had allowed the bell crank assembly 52 to return to the position illustrated in Figure 1, permitting the measuring valve assembly to be recharged ready for another cycle of operation, but in the position shown in Figure 7 the push rod is holding the shut off gate 35 in dispensing position due to the ratchet 63 engaging the notch 65. When the foot pedal 38 was released the spring 66 began to return the lever 44 to the starting position as shown in Figure 1.

An adjustable air relief valve 67 allows the piston within the dash pot 41 to return to starting position at a predetermined rate. When the bell crank 60 of the arm 44 again contacts the end of the push rod 61 it will disengage the ratchet 63, disengaging it from the notch 65, allowing the push rod to be returned to starting position by the spring 68, thereby closing the gate 35. The period of time that the gate 35 is held open is determined by the adjustment of the relief valve 67 which controls the return movement of the dash pot piston and the operation of the arm 44, which causes the release of the push rod 50 as heretofore described.

Referring to Figure 5 the bell crank assembly 52 consists of a cross shaft 69 having a crank arm 70 fixedly mounted thereon to which the rod 53 is pivotally connected. On the opposite end of the shaft a ratchet arm 71 is loosely mounted to the shaft 69. The shaft having a pin 72 fixedly secured therein against which the shoulder 73 of the ratchet engages in one direction. A spring 74 maintains the ratchet arm 71 against this pin except when the end 75 of the push rod 50 must pass the end of the ratchet arm 71 on its return stroke as shown in Figure 1. At this time the spring 74 allows the ratchet arm 71 to revolve about the shaft 69, permitting the point 75 to pass by the end of the ratchet. The amount of mix permitted to enter the freezing chamber may be determined by the adjusting nut or turnbuckle 76 being adjusted to change the length of the rod 53, thereby the stroke of the piston 22. When the machine has been in operation it is easy for the operator to determine the adjustment of the measure valve admitting the proper amount of mix for replacing the product dispensed.

Referring to the mix container 19, this container is of such a design as to be easily cleaned, having rounded bottom corners 77 and a transparent level indicating device 78 is located so that it can be observed through the opening 79 of the cabinet. A removable top 80 covers the mix container 19 together with the cabinet 1. A lid 81 is provided within the cover 80 giving access to the tank 19. I also provide in the side of the cabinet 1 a panel 82 providing access to the interior of the cabinet for making adjustments and for disassembling the parts for cleaning.

I will now describe the operation of the machine. The operator pushes down on the pedal 38 which operates the push rod 50 as heretofore described, opening the dispensing gate 35 operating the bell crank assembly 52, which operates the measuring valve assembly 20, forcing in a predetermined amount of mix into the freezing chamber simultaneously with the product that is being dispensed through the gate 35. The gate 35 being held in open position for a predetermined length of time when it will close automatically by the mechanism having just been described.

I do not wish to be limited to the exact mechanical combinations herein described, as other mechanical equivalents may be substituted still coming within the scope of my claim.

What I claim as new is:

The method of producing and dispensing a frozen product such as ice cream, which method comprises providing a supply of mix suitable for conversion into the frozen product, providing a quantity of the frozen product under refrigeration, dispensing a measured amount of the frozen product for a predetermined period of time, conveying a measured amount of mix from said supply to said frozen product under refrigeration simultaneously with said dispensing and corresponding to the measured amount of frozen product delivered during said predetermined period of time, and agitating said mix and frozen product to provide a uniform frozen product of equal quantity to the original supply.

ANDREW J. TACCHELLA.

REFERENCES CITED

The following references are of record in the file of this patent:

UNITED STATES PATENTS

| Number | Name | Date |
|---|---|---|
| 1,926,061 | Peterson et al. | Sept. 12, 1933 |
| 1,993,130 | Ballew | Mar. 5, 1935 |
| 2,211,387 | Routh | Aug. 13, 1940 |